Patented Dec. 1, 1931

1,834,116

UNITED STATES PATENT OFFICE

ROGER WILLIAMS, OF WILMINGTON, DELAWARE, ASSIGNOR TO DU PONT AMMONIA CORPORATION, OF WILMINGTON, DELAWARE, A CORPORATION OF DELAWARE

PROCESS OF PRODUCING HYDROGEN

No Drawing.    Application filed November 12, 1926.    Serial No. 148,105.

This invention relates to a new catalytic material and to a process of preparing and of using the same, and particularly to improvements in the production of hydrogen from steam and carbon monoxide.

It is known that hydrogen can be produced by a catalyzed reaction of steam and carbon monoxide. The process has particular economic significance because it permits the use of a relatively cheap raw material, that is to say, carbon monoxide-containing gases such as water-gas, producer gas, blast furnace gas, etc.

The catalysts usually mentioned as suitable for the conversion of mixtures of steam and carbon monoxide are oxides, prepared, for example, by precipitation or by ignition of the nitrates of certain metals. While some of these catalysts are useful they are subject to certain defects.

In the copending application of John S. Beekley, Serial No. 148,114, chromium oxide is shown to be superior to previously known catalysts for the reaction, especially from the very important standpoint that it is not sensitive to poisoning by sulfur compounds. It can be used, therefore, for converting carbon monoxide-containing gases such as commercial water-gas, in which considerable amounts of sulfur are present, without preliminary removal of the sulfur. Furthermore, chromium oxide appears to be a poor catalyst for the reaction $2CO = CO_2 + C$, and it can be used in the catalytic production of hydrogen from carbon monoxide and steam without deposition of carbon upon the catalyst, and consequent loss of catalytic activity.

It is the object of this invention to provide an improved and more economical process of conducting catalytic gaseous reactions, a new and more active catalyst adapted particularly for use in the manufacture of hydrogen from steam and carbon monoxide, and an improved process of preparing such a catalyst.

Other objects and advantages of the invention will be apparent as it is better understood by reference to the following specification in which its details and preferred embodiments are described.

I have discovered that, while chromium oxide as ordinarily prepared by precipitation and other methods will catalyze the reaction between steam and carbon monoxide, the speed and efficiency of the reaction are markedly improved by employing the catalyst in the form of a gel. The catalyst in this form also affords the advantages, heretofore mentioned, of chromium oxide catalysts.

According to the invention the catalyst is prepared, for example, by rapidly adding a solution of chrome alum to a solution of potassium hydroxide. The resulting colloidal solution yields on standing for some time a firm jelly which is broken up, washed, filtered and dried. The black, glassy product, hereinafter referred to as "chromium oxide gel", when used in the manufacture of hydrogen by the catalytic reaction of steam and carbon monoxide exhibits a higher activity than chromium oxide prepared by ordinary methods of precipitation or by calcination.

I have further discovered that the activity of the chromium oxide gel and of other gel catalysts may be increased by grinding and forming them into briquettes or pellets such as may be prepared by means of an apparatus of the type employed in the manufacture of pharmaceutical tablets. In this form the catalyst, besides being less susceptible to disintegration with handling, is even more efficient than the simple gel. To attain a given conversion with a fixed volume of this catalyst, it is possible to use a higher rate of gas flow than is practicable with a gel catalyst that has not been ground and briquetted.

The following examples will serve to illustrate the preferred procedure in carrying out the invention, it being understood, however, that the invention is not limited to the details of the operation as herein described.

*Example 1.*—To one liter of a 2.6 normal solution of potassium hydroxide add rapidly an equal volume of a solution containing 250 grams of chrome alum while stirring the potassium hydroxide solution vigorously. (A 3 normal sodium hydroxide solution may be substituted for the same volume of potassium hydroxide solution.) Allow the clear dark green, colloidal solution obtained to set to a firm jelly, break this up and wash it by decantation. Collect the washed product on a filter and dry at about 130° C. The dried material, which is black, glassy and hard, but easily fractured, is broken into fragments of suitable size and these are placed in a silica tube disposed in an electric furnace. Pass over the catalyst a mixture of four volumes of steam and one volume of commercial water-gas containing, for example, 48% hydrogen and 44% carbon monoxide. Raise the temperature of the catalyst to between 300° and 700° C., say 500°, at which temperature the catalyst is thereafter maintained. I have found that under these conditions and operating at a space velocity of 500, (the space velocity is the volume of gas flowing, measured under standard conditions of temperature and pressure, per volume of catalyst per hour), a conversion is obtained which gives 63% hydrogen, 2% carbon monoxide and 29% carbon dioxide (all on dry basis) in the exit gases. On the other hand, using an ordinary precipitated chromium oxide catalyst under the same conditions, the space velocity could not exceed fifty when attaining the same conversion.

*Example 2.*—Grind some of the dried gel, obtained as in Example 1, to a powder of about 100 mesh and then form the powder into briquettes by compression in an apparatus such as is used in the manufacture of pharmaceutical tablets. Break these briquettes to suitable size and use as the catalyst in an apparatus and under the conditions described in Example 1. I have found in my experiments that with such a catalyst I can attain a space velocity of 1000 with the conversion as in Example 1.

My invention is not to be limited to any theoretical explanation of the improved activity of a chromium oxide gel, although it would seem likely that the increased activity is due to the peculiar structural arrangement of the chromium oxide molecules in the gel, since it may be considered that the removal of the highly dispersed water from the gel on drying leaves an unusual number of chromium oxide molecules available for catalysis. The postulation of either a lattice-like or capillary structure for the gel would offer a plausible explanation for my discovery that by mechanically disintegrating and subsequently briquetting gel the catalytic activity of the material is greatly increased, whereas no such improvement is effected by a similar treatment of precipitated oxides other than gels. It may be that the gel undergoes some change in form in the course of its washing and drying, or during the initial period of its actual use. In any event, I desire it to be understood that in the claims the term "gel" is meant to include the material in the form of a gel or derivatives therefrom, regardless of the changes that may be produced therein by the details of the treatment set forth above, or by any variations thereof that may be employed.

Various changes may be made in the operation as described without departing from the invention or sacrificing any of the advantages thereof.

I claim:—

1. A process of preparing hydrogen, which consists in passing a mixture of steam and carbon monoxide over a chromium oxide gel catalyst.

2. A process of preparing hydrogen, which consists in passing a mixture of steam and carbon monoxide over a chromium oxide gel catalyst at a temperature within the range of 300° to 700° C.

In testimony whereof I affix my signature.

ROGER WILLIAMS.